US008953936B2

United States Patent
Hood

(10) Patent No.: US 8,953,936 B2
(45) Date of Patent: Feb. 10, 2015

(54) METHOD FOR PROTECTION OF MULTI-WAVELENGTH PASSIVE OPTICAL NETWORK

(71) Applicant: David Hood, Palo Alto, CA (US)

(72) Inventor: David Hood, Palo Alto, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 116 days.

(21) Appl. No.: 13/632,463

(22) Filed: Oct. 1, 2012

(65) Prior Publication Data

US 2014/0093232 A1  Apr. 3, 2014

(51) Int. Cl.
*H04B 10/00* (2013.01)
*H04J 14/00* (2006.01)
*H04J 14/02* (2006.01)
*H04B 10/032* (2013.01)

(52) U.S. Cl.
CPC .......... *H04J 14/0297* (2013.01); *H04B 10/032* (2013.01); *H04J 14/0295* (2013.01)
USPC .................................... 398/7; 398/66; 398/72

(58) Field of Classification Search
CPC .............. H04J 14/0291; H04J 14/0295; H04J 14/0287; H04J 14/0297; H04J 14/0268; H04J 14/0247; H04J 14/0283; H04J 14/0227; H04J 2203/006; H04B 10/032; H04Q 11/0005; H04Q 2011/0081; G02F 1/00
USPC .............................. 398/1–8, 66–73, 135–139
See application file for complete search history.

(56) References Cited

U.S. PATENT DOCUMENTS

| | | | | | |
|---|---|---|---|---|---|
| 5,299,293 | A | * | 3/1994 | Mestdagh et al. | 398/24 |
| 5,357,360 | A | * | 10/1994 | Imhoff et al. | 398/100 |
| 5,777,761 | A | * | 7/1998 | Fee | 398/7 |
| 6,411,410 | B1 | * | 6/2002 | Wright et al. | 398/79 |
| 6,868,232 | B2 | * | 3/2005 | Park et al. | 398/5 |
| 7,099,578 | B1 | * | 8/2006 | Gerstel | 398/5 |
| 7,676,156 | B2 | * | 3/2010 | Wellen | 398/69 |
| 7,835,268 | B2 | * | 11/2010 | Tanaka | 370/216 |
| 7,865,077 | B2 | * | 1/2011 | Mukojima | 398/1 |
| 8,019,220 | B2 | * | 9/2011 | Ozaki | 398/66 |
| 8,422,887 | B2 | * | 4/2013 | Haramaty et al. | 398/151 |

(Continued)

FOREIGN PATENT DOCUMENTS

WO  WO-9725829  7/1997

OTHER PUBLICATIONS

ITU-T G.984.1, 2008, *Gigabit-capable passive optical networks (GPON): General Characteristics*; pp. 6-11.

*Primary Examiner* — Ken Vanderpuye
*Assistant Examiner* — Dibson Sanchez
(74) *Attorney, Agent, or Firm* — Blakely, Sokoloff, Taylor & Zafman, LLP

(57) ABSTRACT

An Optical Line Termination (OLT) system in a multi-wavelength Passive Optical Network (PON) includes a protection port for protecting a set of OLT ports without the use of a physical switch. The protection port has a tunable transceiver. The OLT system detects a failure of one of the OLT ports, which was originally adapted to transmit downstream traffic to a subset of ONUs on a downstream wavelength and to receive upstream traffic from the subset of ONUs on an upstream wavelength. In response to the detection, the OLT system tunes the protection port to the downstream wavelength for transmission and to the upstream wavelength for reception, and resumes communication between the OLT system and the subset of ONUs through the protection port instead of the OLT port.

18 Claims, 5 Drawing Sheets

(56) References Cited

U.S. PATENT DOCUMENTS

| | | | |
|---|---|---|---|
| 8,467,676 B2* | 6/2013 | Villarruel et al. | 398/10 |
| 8,538,261 B2* | 9/2013 | Johansson et al. | 398/58 |
| 8,611,740 B2* | 12/2013 | Grossman et al. | 398/19 |
| 8,615,169 B2* | 12/2013 | Mie et al. | 398/70 |
| 2002/0071149 A1* | 6/2002 | Xu et al. | 359/110 |
| 2004/0033077 A1* | 2/2004 | Kim et al. | 398/72 |
| 2005/0149500 A1* | 7/2005 | Marmaros et al. | 707/3 |
| 2005/0175344 A1* | 8/2005 | Huang et al. | 398/79 |
| 2006/0115271 A1* | 6/2006 | Hwang et al. | 398/72 |
| 2006/0120718 A1 | 6/2006 | Natori | |
| 2008/0292314 A1* | 11/2008 | Lu | 398/58 |
| 2009/0067838 A1* | 3/2009 | Chen et al. | 398/58 |
| 2009/0154925 A1* | 6/2009 | Chen | 398/58 |
| 2009/0245792 A1* | 10/2009 | Oishi et al. | 398/66 |
| 2010/0098407 A1* | 4/2010 | Goswami et al. | 398/5 |
| 2010/0119228 A1* | 5/2010 | Zhou et al. | 398/66 |
| 2010/0166419 A1* | 7/2010 | Elmoalem et al. | 398/2 |
| 2010/0183300 A1* | 7/2010 | Yokotani | 398/41 |
| 2011/0013903 A1* | 1/2011 | Rafel Porti et al. | 398/1 |
| 2011/0280568 A1* | 11/2011 | Dvir et al. | 398/13 |
| 2011/0317995 A1* | 12/2011 | Zheng | 398/2 |
| 2012/0082448 A1 | 4/2012 | Bouda et al. | |
| 2012/0141139 A1* | 6/2012 | Bakhru et al. | 398/158 |
| 2012/0183297 A1* | 7/2012 | Rohde et al. | 398/90 |
| 2012/0195589 A1* | 8/2012 | Nors | 398/5 |
| 2012/0237213 A1* | 9/2012 | Yin et al. | 398/28 |
| 2013/0121684 A1* | 5/2013 | Smith et al. | 398/5 |
| 2013/0148956 A1* | 6/2013 | Khotimsky et al. | 398/2 |
| 2013/0188946 A1* | 7/2013 | Haramaty et al. | 398/5 |
| 2014/0050471 A1* | 2/2014 | Bernasconi | 398/2 |

* cited by examiner

METHOD FOR PROTECTION OF MULTI-WAVELENGTH PASSIVE OPTICAL NETWORK

TECHNICAL FIELD

Embodiments of the invention relate to a Passive Optical Network (PON); and more specifically, to a wavelength division multiplexing (WDM) PON.

BACKGROUND

A passive optical network (PON) consists of one or more Optical Line Termination (OLT) systems, a number of Optical Network Units (ONUs), and an optical distribution network (ODN) including fibers and splitters between the OLT systems and the ONUs. Each OLT system is a service provider node located in a central office, and each ONU is a subscriber node. One type of PON is a wavelength division multiplexing (WDM) PON, which multiplexes a number of optical carrier signals onto a single optical trunk fiber by using different wavelengths (colors) of laser light. The wavelengths are arranged to serve disjoint subsets of the ONUs.

One conventional method for protecting network and equipment in a PON uses a protection port for every working port. Such protection method is described in, for example, ITU-T G.984.1. The need to dedicate a protection facility to each working facility, along with its port electronics and a significant share of the electronics beyond the port, adds substantial cost to the network. The cost of this mostly unused protection facility and its electronics may exceed the value of protection, leading to the omission of protection and hence, lower service reliability.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

SUMMARY

Figure 1:
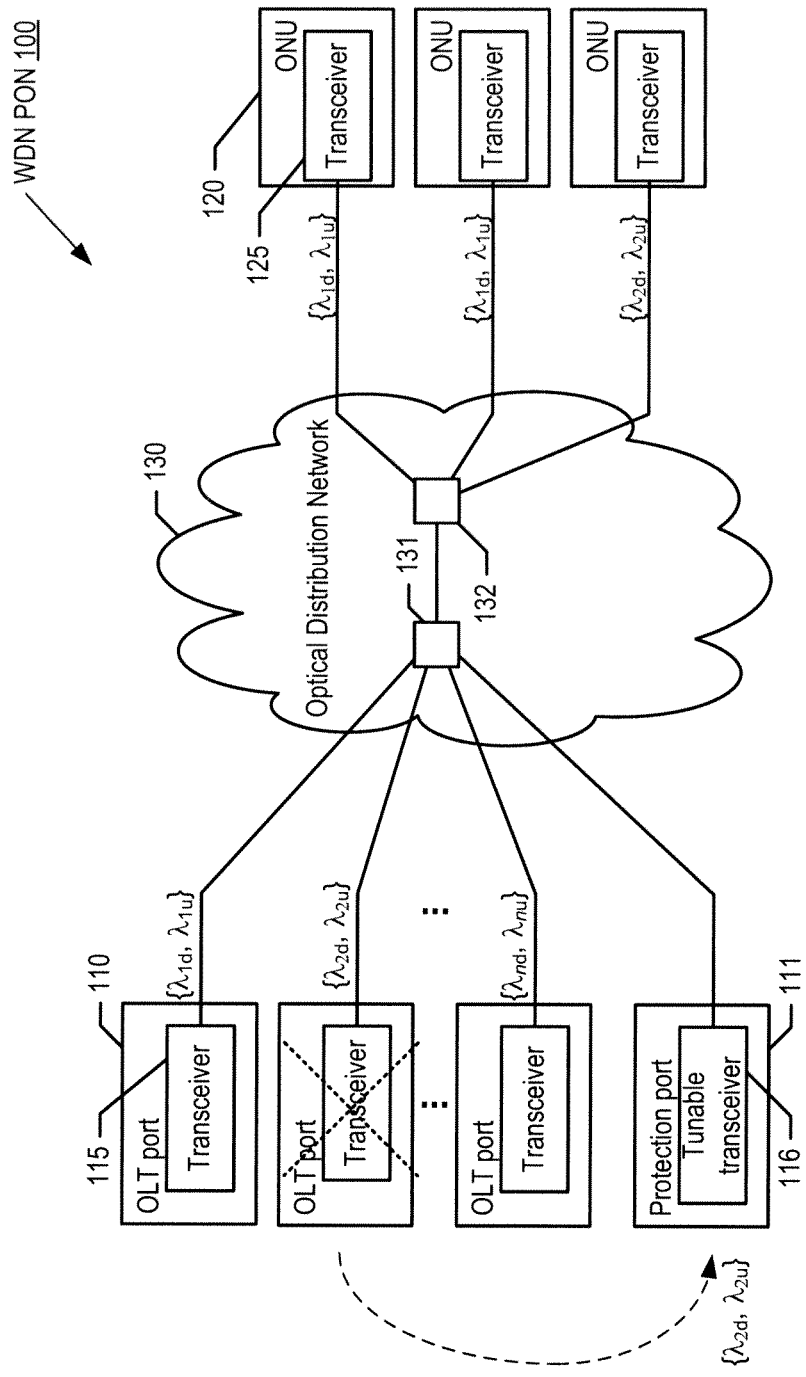
FIG. 1 illustrates an example of a PON in which an embodiment of the invention may operate.

Embodiments of the invention provide an OLT system for protecting a plurality of OLT ports against failure without the use of a physical switch. The OLT system includes OLT ports for providing telecommunication services to a plurality of ONUs in a WDM PON, and at least a protection port for providing the protection.

In one embodiment, a method performed by the OLT system comprises: detecting a failure of one of the OLT ports, which was originally adapted to transmit downstream traffic to a subset of ONUs on a downstream wavelength and to receive upstream traffic from the subset of ONUs on an upstream wavelength. In response to the detection, the OLT system tunes the protection port to the downstream wavelength for transmission and to the upstream wavelength for reception, and resumes communication between the OLT system and the subset of ONUs through the protection port instead of the OLT port. Although not shown in the figures, it is understood that traffic on the network side of the OLT ports must also be re-routed, through cooperative exchanges between the affected OLT ports and/or a management system.

In another embodiment, a network element functioning as an OLT system includes OLT ports and a protection port having a tunable transceiver. A first one of the OLT ports is originally adapted to transmit downstream traffic to a subset of ONUs on a downstream wavelength and to receive upstream traffic from the subset of ONUs on an upstream wavelength. The network element further includes a plurality of control processors that are associated with the plurality of OLT ports and the protection port respectively, and are connected to each other via an intercommunication network. One of the control processors that is associated with the protection port is adapted to receive an indication of failure of the first OLT port, which may be a positive indication (a message) or a negative indication (timeout or loss of signal). Upon receiving the indication, the control processor is adapted to direct the protection port to tune to the downstream wavelength for transmission and to the upstream wavelength for reception, and enable communication between the OLT system and the subset of ONUs through the protection port instead of the first OLT port.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a protection mechanism to a plurality of working OLT ports in a multi-wavelength PON without the need for a physical switch. The protection is achieved through a protection facility in an OLT system that has the ability to tune the wavelengths of one or more of its transceivers that terminate the protection facility. In one embodiment, the protection facility is a single protection port within an OLT system. In an alternative embodiment, the protection facility includes multiple protection ports within one or more OLT systems. These protection ports can coordinate with each other to protect the plurality of working OLT ports that are in the same OLT system or across multiple OLT systems.

As used herein, the term "wavelength set" refers to a downstream wavelength and an upstream wavelength that are jointly used for communication between a particular OLT port and a subset of the ONUs on the PON. The term "downstream" refers to the direction from an OLT port to an ONU, and the term "upstream" refers to the direction from an ONU to an OLT port. Further, the term "network traffic" refers to the traffic exchanged over a wide area network, and the term "PON traffic" refers to the traffic exchanged within a WDM PON, that is, between OLT ports and ONUs.

The protection mechanism described herein can be implemented in a WDM PON delivering dedicated services (i.e., one wavelength set per ONU) via WDM. This type of WDM PON can be deployed for business customers (which may transfer point-to-point traffic according to IEEE 802.3 or mobile backhaul (which may transfer point-to-point traffic according to Common Public Radio Interface (CPRI)). The protection mechanism can also be implemented in a WDM PON where a wavelength set is shared by multiple ONUs via time division multiplexing (TDM). For example, multiple TDM PON systems can exist in parallel on the same fiber plant, where the TDM PON systems may include a plurality of systems according to any combination of ITU-T G.984, ITU-T G.987, IEEE 802.3 (EPON and 10GEPON), or a time and wavelength division PON (which is a parallel configuration of the ITU-T G.987 system). Further, the protection mechanism is also applicable to hybrid PONs with both TDM and dedicated wavelengths. However, as the protocols are quite different, it may be necessary to have different protection ports for the different signal types, rather than a single protection port for the entire PON.

FIG. 1 illustrates a WDM PON system 100 according to one embodiment of the invention. The system 100 includes a plurality of OLT ports 110, each including a transceiver 115 configured to transmit downstream traffic on a wavelength and to receive upstream traffic on the same or a different wavelength. The wavelength sets used by different OLT ports 110 are chosen to differ, thereby providing parallel connectivity to a plurality of ONUs 120. The OLT ports 110 may be located in an OLT system that is housed in a single central office, or may be distributed across multiple OLT systems, housed in one or more central offices in multiple geographic areas. Each OLT system may be contained in an OLT chassis.

In one embodiment, the wavelengths of OLT ports 110 are tunable, and these wavelengths are administratively assigned to fixed values that do not change except during installation or upgrade activities. In an alternative embodiment, the OLT transceivers 115 are not tunable, but are fixed, each assigned to its designated set of upstream and downstream wavelengths. In either case, the choice of OLT port wavelength is administratively determined and remains unchanged for extended periods of time.

Each ONU 120 includes a transceiver 125 that is configured to receive downstream traffic on a wavelength and to transmit upstream traffic on the same or a different wavelength. Some of the ONUs 120 may be configured to receive/transmit on the same wavelength set. By way of example and not limitation, two of the ONUs 120 in FIG. 1 are shown sharing a single downstream/upstream wavelength pair $\{\lambda_{1d}, \lambda_{1u}\}$; e.g., on a time division basis.

An optical distribution network (ODN) 130 is configured to provide wavelength connectivity between any given OLT port 110 and its intended set of ONUs 120. The ODN 130 may be fully transparent to all wavelengths across the spectrum of interest, or may contain wavelength filter elements. By "fully transparent to a wavelength spectrum," it means that all of the wavelengths in the spectrum are visible at a receiving end of the network. The ODN 130 includes a single trunk fiber that connects a central office end to a subscriber end. The central office end may branch out into one or more OLT ports at one or more central offices, and the subscriber end may similarly branch out into one or more ONUs, located at or near subscriber premises. By way of example and not limitation, the ODN 130 comprises a centralized power splitter 131 located at the central office end of the fiber, and a remote power splitter 132 located at the subscriber end. A power-splitter ODN, such as the ODN 130 of FIG. 1, is fully transparent to all wavelengths of interest.

In an embodiment, a protection port 111 is added to the set of OLT ports 110 to provide protection to the OLT ports 110. The protection port 111 is fitted with a tunable transceiver 116, which can be tuned to at least a plurality of upstream/downstream wavelength sets that may be assigned to the working OLT ports 110. In an embodiment where some or all of the OLT ports 110 have tunable transceivers, any of these ports with a tunable transceiver can be designated as a protection port.

Although not shown in FIG. 1, the OLT ports 110, 111 of the system 100 are also connected to a wide area network and exchange network traffic with other network entities via the wide area network. When PON traffic is switched to a different OLT port (e.g., the protection port 111) for protection, the network traffic must correspondingly be re-routed, a function that may involve cooperation among the failed OLT port 110, the protection port 111, management systems, and possibly other systems. This network traffic rearrangement is not shown in the figures.

During normal operation, each of the OLT ports 110 functions as a working OLT port, which transfers telecommunications traffic between itself and its designated ONUs 120. If one of the OLT ports 110 fails, or loses its optical connectivity, the protection port 111 tunes its transceiver 116 to the wavelength set of the failed OLT port and resumes the transfer of telecommunications traffic with those designated ONUs. The example of FIG. 1 illustrates a scenario in which the OLT port 110 assigned with the wavelength set $\{\lambda_{2d}, \lambda_{2u}\}$ has failed. The protection port 110 may, automatically or in response to a command or request, switch over from a standby mode to an active mode, and tune to the wavelength set $\{\lambda_{2d}, \lambda_{2u}\}$ to take over the traffic for the failed OLT port 110. The term "switchover" herein does not indicate or imply the use of a physical switch. In fact, no physical switch is used for the protection port 111 to take over the operation of the failed OLT port 110.

In one embodiment, the protection port 111 is not necessarily in standby mode before the protection switch. For example, the protection port 111 may be used for testing, monitoring and diagnostic purposes when it is not in service protecting one of the OLT ports 110. In such an embodiment, the protection port 111 may be assigned to a distinct wavelength set that does not interfere with the ongoing traffic of the OLT ports 110 and ONUs 120. In one embodiment, the distinct wavelength set may vary from time to time, as appropriate for the purpose of testing, monitoring or diagnosis.

Figure 2:
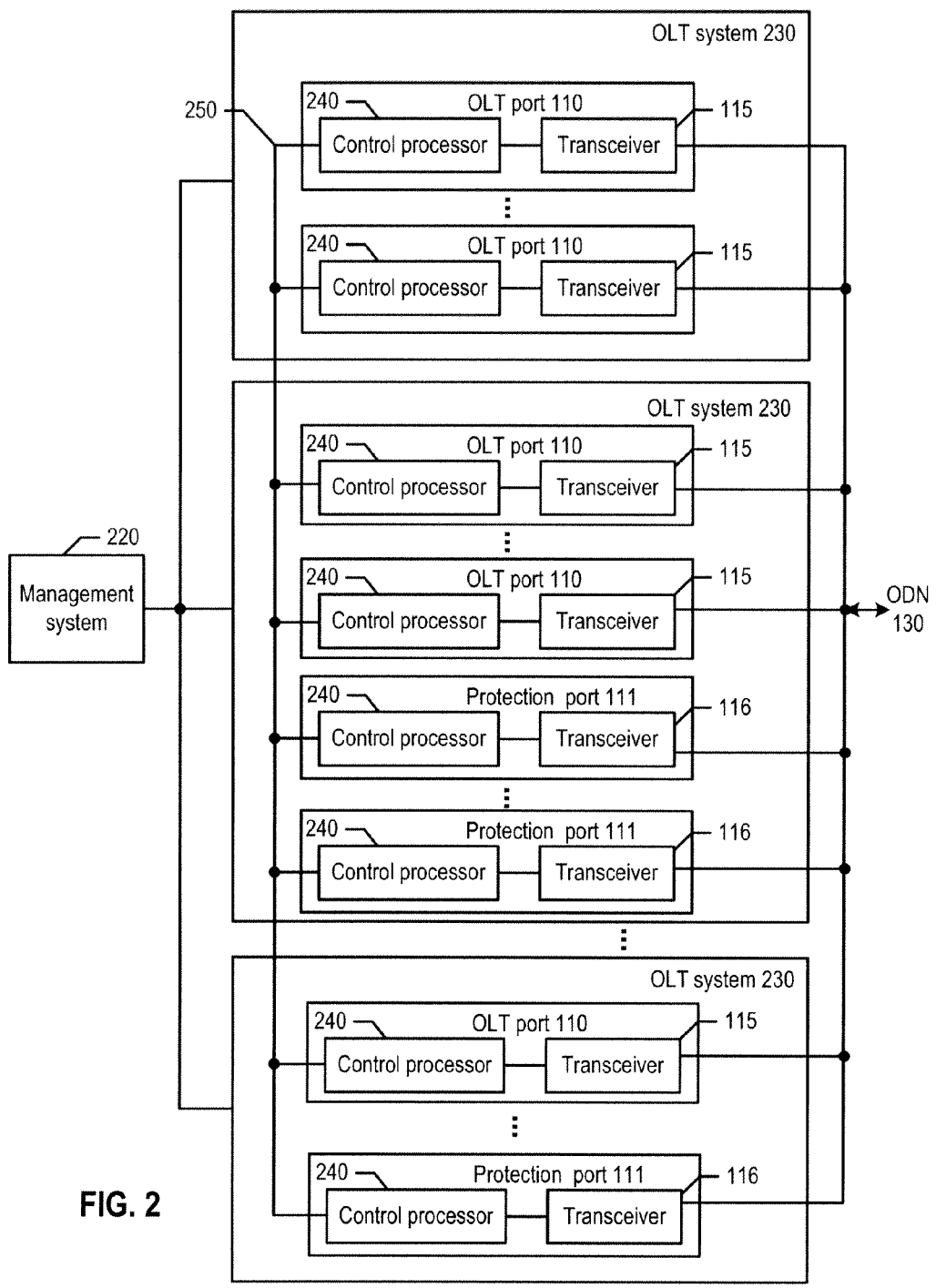
FIG. 2 illustrates an example of multiple protection ports shared by multiple OLT systems according to one embodiment of the invention.

FIG. 2 illustrates an example of a system configuration of multiple OLT systems 230 according to one embodiment. Each OLT system 230 may be contained in a single OLT chassis. The multiple OLT systems 230 may be located in a single geographic location, or may be located across geographically diverse locations, thereby supporting multiple homing for ONUs and protecting against large-scale failures, for example, tornados, earthquakes, etc, that could disable or destroy an entire central office. The OLT systems 230 are within a single PON, as characterized by the sharing of a common trunk fiber in the ODN 130, exchanging PON traffic with a set of ONUs over the ODN 130.

This example shows a control processor 240 associated with each of the ports 110 and 111. A management system 220 is responsible for overall system knowledge and priority setting of the ports 110 and 111. The control processors 240 can exchange information via an interconnection network 250, at least between any OLT ports 110 and the protection OLT ports 111.

The example of FIG. 2 also shows that some of the OLT systems 230 include one or more protection ports 111 and some of the OLT systems 230 include no protection ports 111. In one embodiment, the protection ports 111 across different OLT systems 230 may coordinate with each other to provide protection for multiple failures of the OLT ports 110 in any of the OLT systems 230.

When one protect port 111 receives protection switch requests from multiple failed OLT ports, the requests may be prioritized as described below in the example of FIG. 3.

Figure 3:
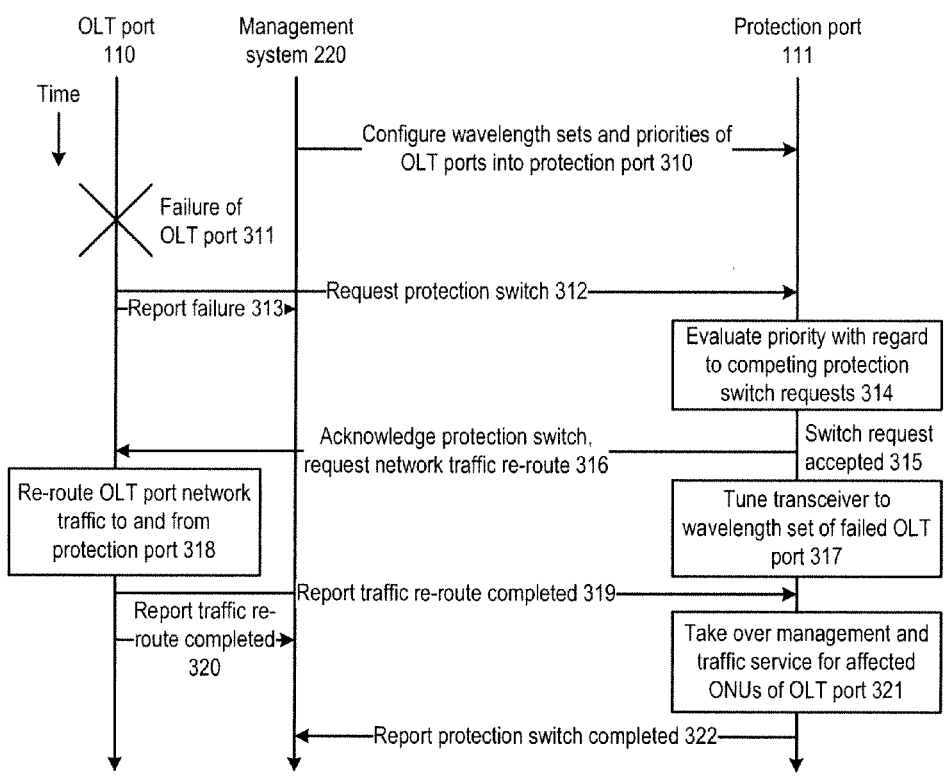
FIG. 3 is a diagram illustrating a failure scenario of an OLT port according to one embodiment of the invention.

FIG. 3 illustrates an example of a failure scenario according to one embodiment of the invention. In this example, it is assumed that the protection port 111 is configured to protect a set of OLT ports 110, one of which fails. It is understood that operations of the failed OLT port 110 and protection port 111, such as detecting, evaluating, requesting, reporting, acknowledging, tuning, re-routing, and the like, may be performed or directed by the control processors 240 associated with the respective ports.

During configuration, the management system 220 configures wavelength sets and priorities of the OLT ports 110 into the protection port 111 (310). At a certain point of network operation, one OLT port 110 detects its failure (including loss of connectivity) (311), and requests the protection port 111 for a protection switch (312). The failed OLT port 110 also reports the failure to the management system 220 (313). It is understood that the request or report may alternatively take the form of timeouts at the receiving end, whereby the protection OLT port 111 or the management system 220 fails to receive expected heartbeat messages from the working OLT port 110. The protection port 111 evaluates the request, and in particular compares the priority of this request with the priorities of other competing protection switch requests if there are any (314). In one embodiment, when there are multiple competing requests for a protection switch, a higher priority request will preempt a lower priority request.

Assuming that the protection switch request is accepted (315), the protection port 111 acknowledges the protection switch and requests the failed OLT port 110 and possibly other network elements (not shown) to re-route the network traffic (not the PON traffic) (316). The protection port 111 tunes its transceiver 116 to the wavelength set of the failed OLT port 110 (317). At the failed OLT port 110 after receiving the re-route request from the protection port 111, the failed OLT port 110 cooperates to re-route the network traffic to and from the protection port 111 (318). The failed OLT port 110 then reports the completion of the network traffic re-route to the protection port (319) and the management system (320). The protection port 111 takes over the management and traffic load of the affected ONUs 120 (i.e., the ONUs that were assigned to the failed OLT port 110) as soon as the network traffic has been re-routed (321), using information about the set of subtended ONUs that may have been communicated by the failed OLT port 110 or configured by the management system 220 or both. The protection port 110 then reports to the management system 220 the completion of the protection switch (322).

It is understood that additional signal exchanges may occur among the failed OLT port 110, the management system 220 and the protection port 111. For example, after the protection switch is completed, both the failed OLT port 110 and the protection port 111 may signal the management system 220 for alarm and fault diagnosis purposes.

Figure 4:
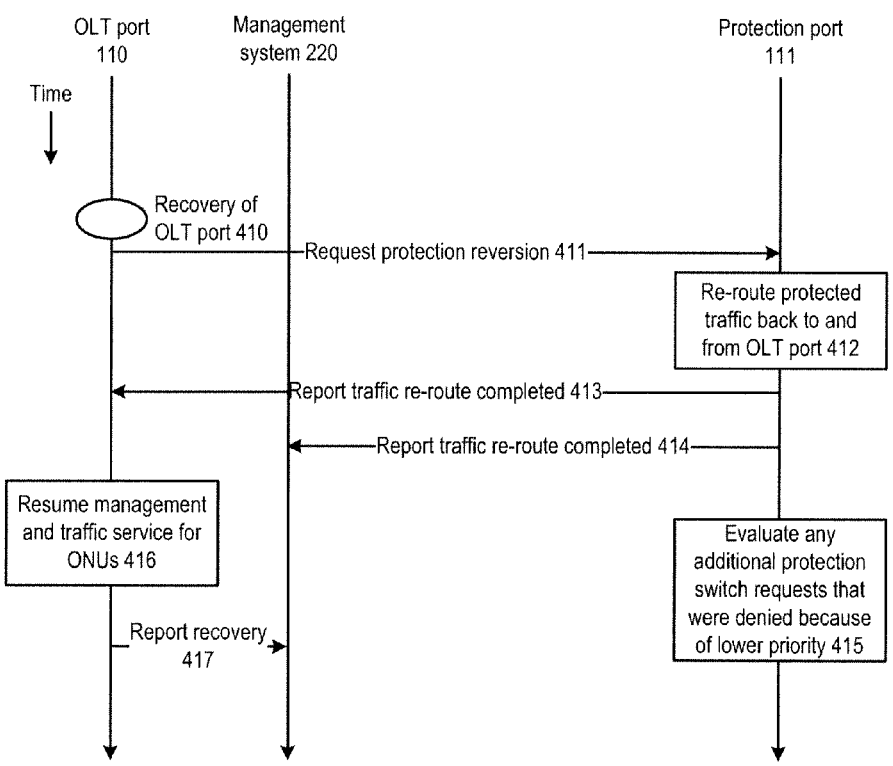
FIG. 4 is a diagram illustrating a recovery scenario of an OLT port according to one embodiment of the invention.

FIG. 4 illustrates an example of a recovery scenario according to one embodiment of the invention. In the following, it is understood that operations of the OLT port 110 and the protection port 111, such as evaluating, requesting, reporting, resuming, and the like, may be performed or directed by the control processors 240 associated with the respective ports.

In this example, it is assumed that the PON traffic of the failed OLT port 110 is being carried by the protection port 111. At a certain point during network operation, the failed OLT port 110 is repaired (410), and this port (now referred to as the recovered OLT port 110) signals the protection port 111 for protection reversion (411). In response, the protection port 111 re-routes protected PON traffic back to and from the recovered OLT port 110 (412). The two OLT ports 110 and 111, and/or the management system 220, and/or other network elements also cooperate to re-route network traffic to and from the recovered OLT port 110 (not shown). At a suitable point in the switchover, the protection port 111 may disable its transceiver (or at least its transmitter) to avoid interfering with the recovered OLT port 110.

The protection port 111 then reports the completion of traffic re-route to the recovered OLT port 110 (413) and the management system 220 (414). The protection port 111 may also evaluate any additional protection switch requests that were previously denied because of their lower priorities (415). If there are no more protection switch requests, the protection port 111 may enter the standby mode. Alternatively, the protection port 111 may perform testing, monitoring and diagnostic functions on wavelengths not interfering with the recovered OLT port 110 or other working OLT ports 110.

Once the recovered OLT port 110 receives the report from the protection port 111, it resumes management and traffic service for the ONUs 120 that were designated to this OLT port before its failure (416). The recovered OLT port 110 then reports the recovery to the management system 220 (417).

In the example of FIG. 4, a failover from a failed OLT port to a protection port 111 is temporary until the failed port is repaired, after which the protection port 111 reverts to serve as a protection port again. In an alternative embodiment, a failover from a failed port 110 to a protection port 111 may be non-revertive in that the protection port 111 continues to operate for the failed port even after the failed port 110 is repaired. One benefit of the non-revertive embodiment is that there is no additional disruption of traffic engendered by the protection port switching back to the original configuration upon the completion of repairs. In an embodiment where the OLT port and the protection port both have tunable transceivers, the recovered OLT port 110 may be re-designated as a new protection port.

In an embodiment, the ONUs 120 may comprise tunable transceivers. In such an embodiment, the protection port 111 may be used to carry normal traffic on a separate wavelength set, with its own set of ONUs 120. Assume that a first set of ONUs is designated to the protection port 111, and a second set of ONUs is designated to an OLT port 110 that fails. When a protection switch occurs, the second set of ONUs may be reassigned to the wavelength set used by the protection port 111, accessing the protection port 111 with the first set of ONUs on a shared basis (e.g., through time division multiplexing). In an alternative embodiment, the first set of ONUs and the protection port 111 may be reassigned to the wavelength set of the failed OLT port 110. In an embodiment where there are multiple protection ports 111 carrying normal traffic on separate wavelength sets, the second set of ONUs may be reassigned to these separate wavelength sets, thus spreading the load across the multiple protection ports 111.

Figure 5:
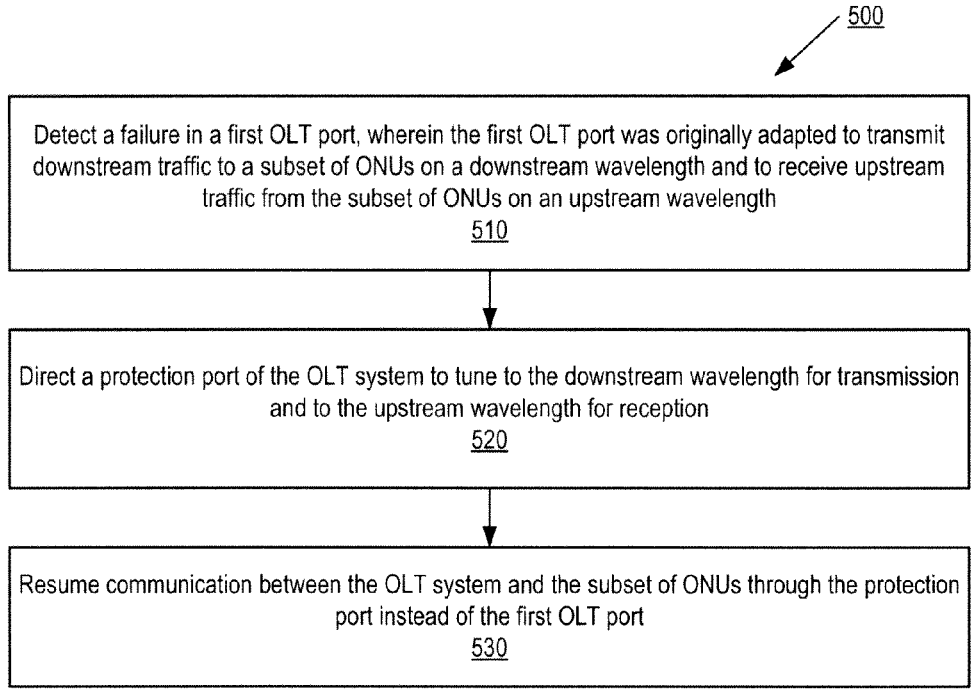
FIG. 5 is a flow diagram illustrating a method for protecting OLT ports according to one embodiment of the invention.

FIG. 5 illustrates one embodiment of a method 500 for protecting a set of OLT ports with a protection port. The method 500 may be performed by a control processor (referred to as a "protection control processor" in the following) that is associated with one of the protection ports 111 of FIG. 2, such as any of the control processors 240 of FIG. 2.

In one embodiment, the protection control processor detects a failure of an OLT port (block 510). This failed OLT port was originally adapted to transmit downstream traffic to a subset of ONUs on a downstream wavelength and to receive upstream traffic from the subset of ONUs on an upstream wavelength. The protection control processor then directs the protection port to tune to the downstream wavelength for transmission and to the upstream wavelength for reception (block 520), and after coordinating the re-routing of network traffic (not shown) from the failed OLT port to the protection OLT port, restores communication between the OLT system and the subset of ONUs through the protection port instead of the OLT port (block 530).

Figure 6:
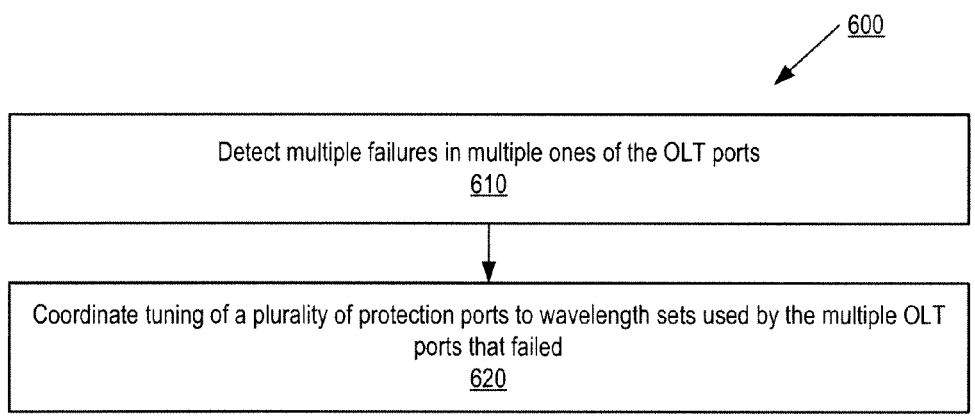
FIG. 6 is a flow diagram illustrating a method for protecting OLT ports with multiple protection ports according to one embodiment of the invention.

FIG. 6 illustrates one embodiment of a method 600 for protecting a set of OLT ports with multiple protection ports. In one embodiment, the protection control processor detects multiple failures in multiple ones of the OLT ports (block 610). The protection control processor coordinates tuning of a plurality of protection ports to wavelength sets used by the multiple OLT ports that failed (block 610). The protection ports and the failed OLT ports may be located in different OLT systems and in different geographic locations. Each protection port may take over the traffic load of one failed OLT port. Alternatively, the traffic load of the failed OLT ports may be spread across multiple protection ports. Though for simplicity not shown in FIG. 6, it will be apparent to those skilled in the art that the multiple failures (and restorations) may occur concurrently, at different but overlapping periods of time, or at different points in time.

The operations of the diagrams of FIGS. 3-6 have been described with reference to the exemplary embodiment of FIGS. 1-2. However, it should be understood that the operations of the diagrams of FIGS. 3-6 can be performed by embodiments of the invention other than those discussed with reference to FIGS. 1-2, and the embodiment discussed with reference to FIGS. 1-2 can perform operations different from those discussed with reference to the diagrams of FIGS. 3-6. While the diagrams of FIGS. 3-6 show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and transmit (internally and/or with other electronic devices over a network) code (composed of software instructions and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware As used herein, a network element (e.g., a router, switch, bridge, controller) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VoIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method performed by an Optical Line Termination (OLT) system for protecting a plurality of OLT ports against failure without the use of a physical switch, the OLT system including a plurality of OLT ports for providing telecommunication services to a plurality of Optical Network Units (ONUs) in a Wavelength Division Multiplexing (WDM) Passive Optical Network (PON), the method comprising the steps of:
   detecting by the OLT system a failure of a first OLT port in the plurality of OLT ports, wherein the first OLT port was originally adapted to transmit downstream traffic to a first subset of ONUs in the plurality of ONUs on a first downstream wavelength and to receive upstream traffic from the first subset of ONUs on a first upstream wavelength, and wherein a protection port was originally adapted to transmit downstream traffic to a second subset of ONUs in the plurality of ONUs on a second downstream wavelength and to receive upstream traffic from the second subset of ONUs on a second upstream wavelength when not in service protecting one of the OLT ports, where the first downstream wavelength and the first upstream wavelength form a first wavelength set, and where the second downstream wavelength and the second upstream wavelength form a second wavelength set;

informing the first subset of ONUs to tune to the second wavelength set used by the second subset of ONUs for transmission and reception, or informing the second subset of ONUs to tune the first wavelength set used by the first subset of ONUs for transmission and reception, upon detection of failure in the first OLT port;

tuning the protection port of the OLT system to the first wavelength set for transmission and reception if the second subset of ONUs were informed to tune to the first wavelength set or keeping the protection port tuned to the second wavelength set for transmission and reception if the first subset of ONUs were informed to tune to the second wavelength set; and resuming communication between the OLT system and both the first subset of ONUs and the second subset of ONUs on a shared basis through the protection port.

2. The method of claim 1, further comprising the steps of:
detecting failures in multiple ones of the OLT ports; and
coordinating tuning of a plurality of protection ports to wavelength sets used by the multiple OLT ports that failed.

3. The method of claim 1, further comprising the steps of:
detecting failures in multiple ones of the OLT ports that include a higher priority OLT port and a lower priority OLT port; and
accepting a protection switch request from the higher priority OLT port to thereby preempt a protection switch request from the lower priority OLT port.

4. The method of claim 1, wherein the OLT system is a member of a group of OLT systems, and wherein the protection port of the OLT system protects more than one OLT port in the group.

5. The method of claim 1, further comprising the steps of:
detecting that that the first OLT port has recovered from failure; and
designating the first OLT port as a new protection port.

6. The method of claim 1, wherein the protection port and one or more of the plurality of OLT ports use one or more tunable transceivers for transmission and reception.

7. The method of claim 1, wherein one or more of the plurality of OLT ports use fixed wavelengths for transmission and reception, and the protection port uses one or more tunable transceivers for transmission and reception.

8. The method of claim 1, wherein each of the plurality of OLT ports exchanges information with the protection port regarding failure status of the first OLT port.

9. The method of claim 8, wherein the failure status of the first OLT port is reported in a message by the first OLT port, or indicated by timeout of an expected signal from the first OLT port.

10. A network element functioning as an Optical Line Termination (OLT) system to provide telecommunication services to a plurality of Optical Network Units (ONUs) in a Wavelength Division Multiplexing (WDM) Passive Optical Network (PON), the OLT system including a plurality of OLT ports that are protected against failure without the use of a physical switch, the network element comprising:

the plurality of OLT ports, wherein a first OLT port in the plurality of OLT ports was originally adapted to transmit downstream traffic to a first subset of ONUs in the plurality of ONUs on a first downstream wavelength and to receive upstream traffic from the first subset of ONUs on a first upstream wavelength, where the first downstream wavelength and the first upstream wavelength form a first wavelength set;

a protection port coupled to the plurality of OLT ports, the protection port including a tunable transceiver, wherein the protection port was originally adapted to transmit downstream traffic to a second subset of ONUs in the plurality of ONUs on a second downstream wavelength and to receive upstream traffic from the second subset of ONUs on a second upstream wavelength when not in service protecting one of the OLT ports, where the second downstream wavelength and the second upstream wavelength form a second wavelength set;

a plurality of control processors associated with the plurality of OLT ports and the protection port respectively and connected to each other via an intercommunication network, wherein one of the control processors that is associated with the protection port is adapted to:
  receive an indication of failure from the first OLT port,
  inform the first subset of ONUs to tune to the second wavelength set used by the second subset of ONUs for transmission and reception, or informing the second subset of ONUs to tune to the first wavelength set used by the first subset of ONUs for transmission and reception, upon detection of failure in the first OLT port
  direct the tunable transceiver of the protection port to tune to the first wavelength set for transmission and reception if the second subset of ONUs were informed to tune to the first wavelength set or to keep the tunable transceiver of the protection port tuned to the second wavelength set for transmission and reception if the first subset of ONUs were informed to tune to the second wavelength set, and
  enable communication between the OLT system and both the first subset of ONUs and the second subset of ONUs on a shared basis through the protection port.

11. The network element of claim 10, further comprising a plurality of protection ports to protect multiple ones of the OLT ports from multiple failures, wherein the plurality of protection ports coordinate tuning of respective tunable transceivers to wavelength sets used by the multiple OLT ports that failed.

12. The network element of claim 10, wherein a protection switch request from a lower priority OLT port is to be preempted by another protection switch request from a higher priority OLT port.

13. The network element of claim 10, wherein the OLT system is a member of a group of OLT systems, and wherein the protection port of the OLT system protects more than one OLT port in the group.

14. The network element of claim 10, wherein the first OLT port is designated as a new protection port upon detection that the first OLT port has recovered from failure.

15. The network element of claim 10, wherein the protection port and one or more of the plurality of OLT ports use one or more tunable transceivers for transmission and reception.

16. The network element of claim 10, wherein one or more of the plurality of OLT ports use fixed wavelengths for transmission and reception, and the protection port uses one or more tunable transceivers for transmission and reception.

17. The network element of claim 10, wherein each of the plurality of OLT ports exchanges information with the protection port regarding failure status of the first OLT port.

18. The network element of claim 17, wherein the failure status of the first OLT port is reported in a message by the first OLT port, or indicated by timeout of an expected signal from the first OLT port.

* * * * *

UNITED STATES PATENT AND TRADEMARK OFFICE
CERTIFICATE OF CORRECTION

| | | |
|---|---|---|
| PATENT NO. | : 8,953,936 B2 | Page 1 of 1 |
| APPLICATION NO. | : 13/632463 | |
| DATED | : February 10, 2015 | |
| INVENTOR(S) | : Hood | |

It is certified that error appears in the above-identified patent and that said Letters Patent is hereby corrected as shown below:

In the Specification

In Column 7, Line 60, delete "instructions" and insert -- instructions) --, therefor.

In the Claims

In Column 9, Line 14, in Claim 1, delete "tune the" and insert -- tune to the --, therefor.

Signed and Sealed this
Seventh Day of July, 2015

Michelle K. Lee
*Director of the United States Patent and Trademark Office*